US007050161B1

(12) United States Patent
Rakoczy

(10) Patent No.: US 7,050,161 B1
(45) Date of Patent: May 23, 2006

(54) GLOBAL RADIUS OF CURVATURE ESTIMATION AND CONTROL SYSTEM FOR SEGMENTED MIRRORS

(75) Inventor: John M. Rakoczy, Madison, AL (US)

(73) Assignee: The United States of America as represented by the Administration of the National Aeronautics and Space Administration, Washington, DC (US)

( * ) Notice: Subject to any disclaimer, the term of this patent is extended or adjusted under 35 U.S.C. 154(b) by 520 days.

(21) Appl. No.: 10/637,085

(22) Filed: Aug. 6, 2003

(51) Int. Cl.
*G01B 9/00* (2006.01)
*G02B 5/08* (2006.01)

(52) U.S. Cl. ............... 356/125; 359/848; 359/849

(58) Field of Classification Search ............ 356/125; 359/848, 849, 851
See application file for complete search history.

(56) References Cited

U.S. PATENT DOCUMENTS

| 4,467,186 | A | | 8/1984 | Goralnick et al. | |
|---|---|---|---|---|---|
| 4,471,447 | A | | 9/1984 | Williams et al. | |
| 4,560,256 | A | | 12/1985 | Blom | |
| 4,737,621 | A | | 4/1988 | Gonsiorowski et al. | |
| 4,816,759 | A | | 3/1989 | Ames et al. | |
| 4,825,062 | A | | 4/1989 | Rather et al. | |
| 4,904,073 | A | * | 2/1990 | Lawton et al. | 359/851 |
| 4,943,771 | A | | 7/1990 | Fuschetto | |
| 5,099,352 | A | | 3/1992 | Yamamoto et al. | |
| 5,109,349 | A | * | 4/1992 | Ulich et al. | 359/849 |
| 5,113,064 | A | * | 5/1992 | Manhart | 250/201.9 |
| 5,265,034 | A | * | 11/1993 | Breckenridge et al. | 250/201.1 |
| 5,477,393 | A | * | 12/1995 | Sasaki et al. | 359/846 |
| 5,623,270 | A | | 4/1997 | Kempkes et al. | |
| 6,113,242 | A | | 9/2000 | Marker et al. | |
| 6,293,680 | B1 | | 9/2001 | Bruns | |
| 6,800,988 | B1 | * | 10/2004 | Ribak | 310/365 |

FOREIGN PATENT DOCUMENTS

EP 0438664 A2 7/1991

OTHER PUBLICATIONS

John Rakoczy et al., "Global Radius-of-Curvature Estimation and Control for the Hobby-Eberly Telescope," Proceedings of the SPIE, 4837-79 ed., p. 681-692, (Aug. 22, 2002).

* cited by examiner

*Primary Examiner*—Hwa (Andrew) Lee
*Assistant Examiner*—Roy M. Punnoose
(74) *Attorney, Agent, or Firm*—James J. McGroary; Todd E. Marlette

(57) ABSTRACT

An apparatus controls positions of plural mirror segments in a segmented mirror with an edge sensor system and a controller. Current mirror segment edge sensor measurements and edge sensor reference measurements are compared with calculated edge sensor bias measurements representing a global radius of curvature. Accumulated prior actuator commands output from an edge sensor control unit are combined with an estimator matrix to form the edge sensor bias measurements. An optimal control matrix unit then accumulates the plurality of edge sensor error signals calculated by the summation unit and outputs the corresponding plurality of actuator commands. The plural mirror actuators respond to the actuator commands by moving respective positions of the mirror segments. A predetermined number of boundary conditions, corresponding to a plurality of hexagonal mirror locations, are removed to afford mathematical matrix calculation.

21 Claims, 14 Drawing Sheets

*Flow Diagram of GRoC Estimator & Control Unit 140*

| Rings | Segments | Size(Q) | Rank(Q) | RMS(diag(I-Q⁺Q)) |
|---|---|---|---|---|
| 1 | 7 | 17 x 21 | 17 | 0.20 |
| 2 | 19 | 53 x 57 | 53 | 0.08 |
| 3 | 37 | 107 x 111 | 107 | 0.04 |
| 4 | 61 | 179 x 183 | 179 | 0.03 |
| 5 | 91 | 269 x 273 | 269 | 0.02 |

FIG. 11

GLOBAL RADIUS OF CURVATURE ESTIMATION AND CONTROL SYSTEM FOR SEGMENTED MIRRORS

STATEMENT REGARDING FEDERALLY SPONSORED RESEARCH OR DEVELOPMENT

The invention described herein was made by employees of the United States Government and may be manufactured and used by or for the Government for Government purposes without the payment of any royalties thereon or therefore.

BACKGROUND OF THE INVENTION

1. Field of the Invention

The present invention relates to estimation of a Global Radius of Curvature ("GRoC") induced by an edge sensor control system subject to displacements of a segmented mirror's boundary conditions. The present invention further relates to control of a segmented mirror's GRoC to within a prescribed tolerance using estimates of the GRoC.

2. Description of the Related Art

In general, segmented mirrors tiled with hexagons are used as primary mirrors for high powered telescopes and beam directors. Sensing and control of the segmented mirror's Global Radius of Curvature ("GRoC") is used to maintain a figure of the segmented mirror to provide increased image quality. The GRoC is a low fundamental spatial mode of a segmented mirror. Thus, the GRoC has a low spatial frequency and a large magnitude when compared to any other shape or spatial mode of which the segmented mirror can attain. Therefore, the GRoC spatial mode is a significant contributor to the overall image quality attained by a telescope or beam director utilizing a segmented mirror.

Gonsiorowski, et al., U.S. Pat. No. 4,737,621, relates to an integrated adaptive optical wavefront sensing and compensating system. An optical Hartman-type technique is used to sense curvature of a wavefront sensor. The wavefront sensor is integrated with either a deformable or a membrane mirror. While targeted toward monolithic mirrors, Gonsiorowski, et al. does not use a segmented corrector.

Rather et al., U.S. Pat. No. 5,825,062, relates to an extendable large aperture phased array mirror system having a plurality of mirror segments. Rather, et al. relates to a PAMELA telescope residing in a testbed at NASA Marshall Space Flight Center. Rather, et al. senses all degrees-of-freedom with inductive edge sensors supplemented by a Shack-Hartman wavefront sensor. The Shack-Hartman wavefront sensor provides tile information to correct the curvature mode. Monolithic reflectors are replaced with arrays of segments that could be extended to fill a desired aperture.

Ulich, et al., U.S. Pat. No. 5,109,349, relates to an actively controlled segmented mirror. The segments of the mirror are continually adjusted with an active segmented mirror control to provide a reflecting mirror of large diameter. An array of sensors are used to measure differential position errors. Tilt sensors utilized as dedicated curvature sensors present an increase in cost of manufacture of the device.

Manhart, U.S. Pat. No. 5,113,064, relates to an optical method and apparatus for phasing segmented mirror arrays. All degrees of freedom, including curvature, are observable from the combination of Shack-Hartman sensors and edge-overlapping lenslet arrays. A special reference mirror is used to phase the inner ring of segments. Next, a second ring of segments is phased with the first ring. The progressive phasing technique of Manhart limits the ability to provide real-time figure maintenance.

Breckenridge, et al., U.S. Pat. No. 5,265,034, relates to a model for an optical system using feedback controlled optical wavefront compensation. An optical ray-tracing simulation model is used in order to generate a control gain matrix. A feedback control system uses feedback sensors to maintain alignment of the segments and a laser interferometer is used to sense a hinge angle between segments.

SUMMARY OF THE INVENTION

The present invention provides a global radius of curvature estimation and control system for segmented mirrors. By combining an accumulated plurality of past mirror segment actuator commands with an estimator matrix, a plurality of edge sensor bias measurements defining a global radius of curvature for the segmented mirror may be obtained. The edge sensor bias measurements are combined with current edge sensor measurements and edge sensor reference measurements to determine a plurality of edge sensor error signals. The edge sensor error signals are in turn combined with an optimal control gain matrix to determine a plurality of actuator commands.

The present invention also provides a global radius of curvature estimation and control system for segmented mirrors that combines current edge sensor measurements and edge sensor reference measurements to produce a set of edge sensor error signals. a plurality of preliminary actuator commands are formed from the edge sensor error signals and an optimal control gain matrix. The preliminary actuator commands are accumulated and combined with an estimator matrix to provide a plurality of boundary condition actuator commands. The boundary condition actuator commands are then combined with the preliminary actuator commands to produce the final actuator commands for controlling the hexagonal mirror segments.

To afford calculation of the actuator commands from the edge sensor data, without resort to tilt sensor data or inclinometer data, an accumulated total of past actuator commands are stored. The matrix calculations to determine subsequent actuator commands require that a predetermined number of boundary conditions, corresponding to a plurality of hexagonal mirror locations, be removed from the calculation. A preferred number of boundary conditions is four, which are used to define a sphere. As the number of hexagonal mirror segments in a tiled mirror increase, the error introduced by removing the predetermined boundary conditions is decreased.

An apparatus controls positions of plural mirror segments in a segmented mirror with an edge sensor system and a controller. The edge sensor system output current edge sensor measurements corresponding to respective positions of plural mirror segments to the controller. Actuator commands are produced by the controller by comparing the current edge sensor measurements with calculated edge sensor bias measurements representing a global radius of curvature. The plural mirror actuators respond to the actuator commands by moving respective positions of the mirror segments. A global radius estimation and control unit is disposed within the controller to accumulate the actuator commands output from an edge sensor control unit and to calculate the edge sensor bias measurements from accumulated actuator commands and an estimator matrix. A summation unit calculates a plurality of edge sensor error signals from current edge sensor measurements, the edge sensor bias measurements, and edge sensor reference measurements. An optimal control matrix unit then accumulates the plurality of edge sensor error signals calculated by the summation unit and outputs the corresponding plurality of actuator commands.

BRIEF DESCRIPTION OF THE DRAWINGS

FIG. 11 is a table illustrating a figure of merit for five conceivable configurations of hexagonally segmented primary mirrors;

DETAILED DESCRIPTION OF THE PREFERRED EMBODIMENTS

Figure 1:
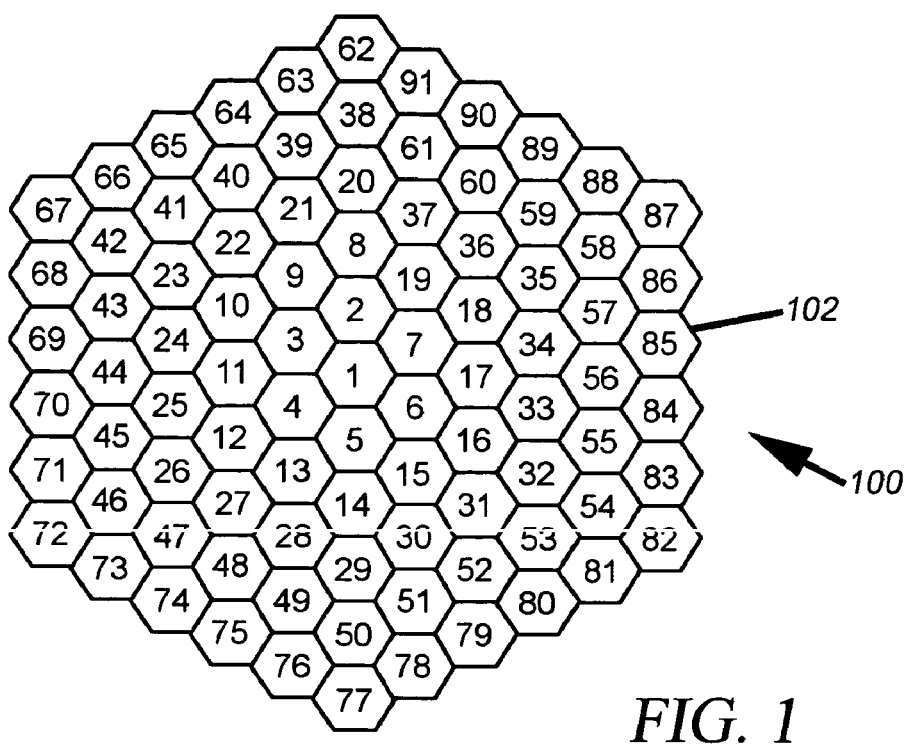
FIG. 1 is a schematic view of a segmented mirror tiled with a plurality of hexagon segments.

With reference now to the drawings and more particularly to FIG. 1, a schematic view of a segmented mirror 100 tiled with a plurality of hexagon segments 102 is illustrated. In general, segmented mirrors tiled with hexagon segments are used as primary mirrors for telescopes and beam directors. In order to increase resolution of segmented mirror 100, according to an embodiment of the invention, sensing and control of the Global Radius of Curvature ("GRoC") is required. The nominal shape of segmented mirror 100 is a conic section, such as a sphere, paraboloid, or hyperboloid, etc., with a specific radius of curvature. First, the magnitude of the Global Radius of Curvature ("GRoC") of the mirror is sensed. Second, the magnitude of the GRoC is controlled to be within a prescribed magnitude.

Figure 2:
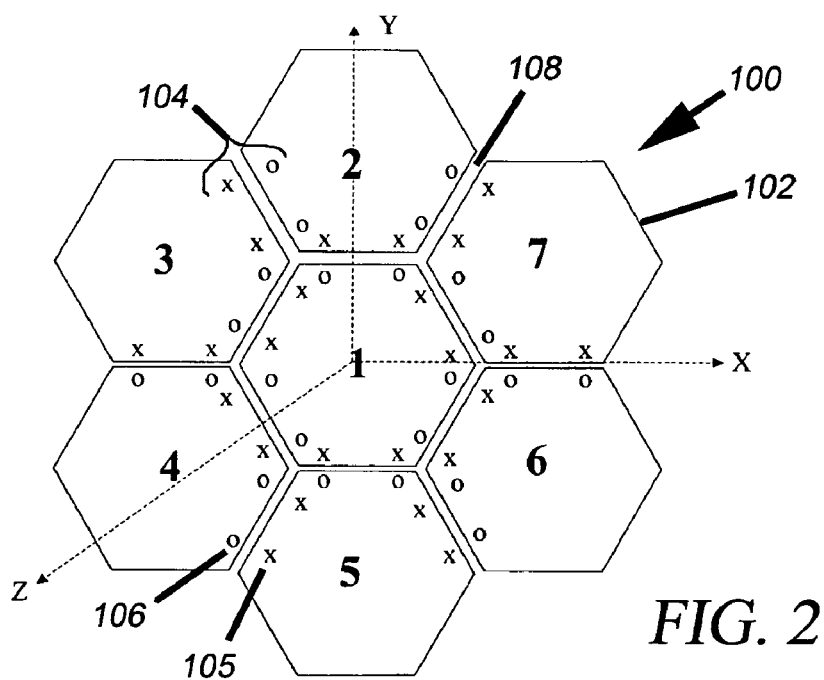
FIG. 2 is a schematic view of a portion of a segmented mirror including a plurality of sensors respectively attached to hexagon segments.

FIG. 2 is a schematic view of a portion of segmented mirror 100 including a plurality of edge sensors 104 respectively attached to mirror segments 102. According to an embodiment of the invention, mirror segments 102 are hexagon mirror segments. Sensing and controlling segmented mirror 100 involves the placement of sensors about the edges of mirror segments 102. Placement locations are illustrated such that the sensors measure the magnitude of the shear displacement at the edges of mirror segments 102. That is, edge sensors 104 sense relative mirror displacement in a direction orthogonal to the nominal mirror figure. Edge sensing approaches generally include capacitive, inductive or optical sensing elements.

As illustrated, each "x" denotes the location of an active sensing element 105, which may be an inductive, capacitive or optical sensing element. Each "o" denotes the location of a passive sensing element 106 that provides a target for sensing an adjacent segment across a segment gap 108. Collectively, an active sensing element "x" and a passive sensing element "o" form an edge sensor 104. The edge sensor 104 outputs the displacement magnitude between each active sensing element "x" 105 and its corresponding passive sensing element "o" 106 along the z-axis.

An approach to sensing the GRoC spatial mode involves supplementing the edge sensors with tilt sensors or inclinometers. This approach utilizes at least one pair of tilt sensors, one on each of two separate segments. The output from one tilt sensor is subtracted from the output of a second corresponding tilt sensor to determine relative angular displacement between the two segments. The angular displacement is a parameter used in defining the magnitude of the GRoC spatial mode.

Figure 3:
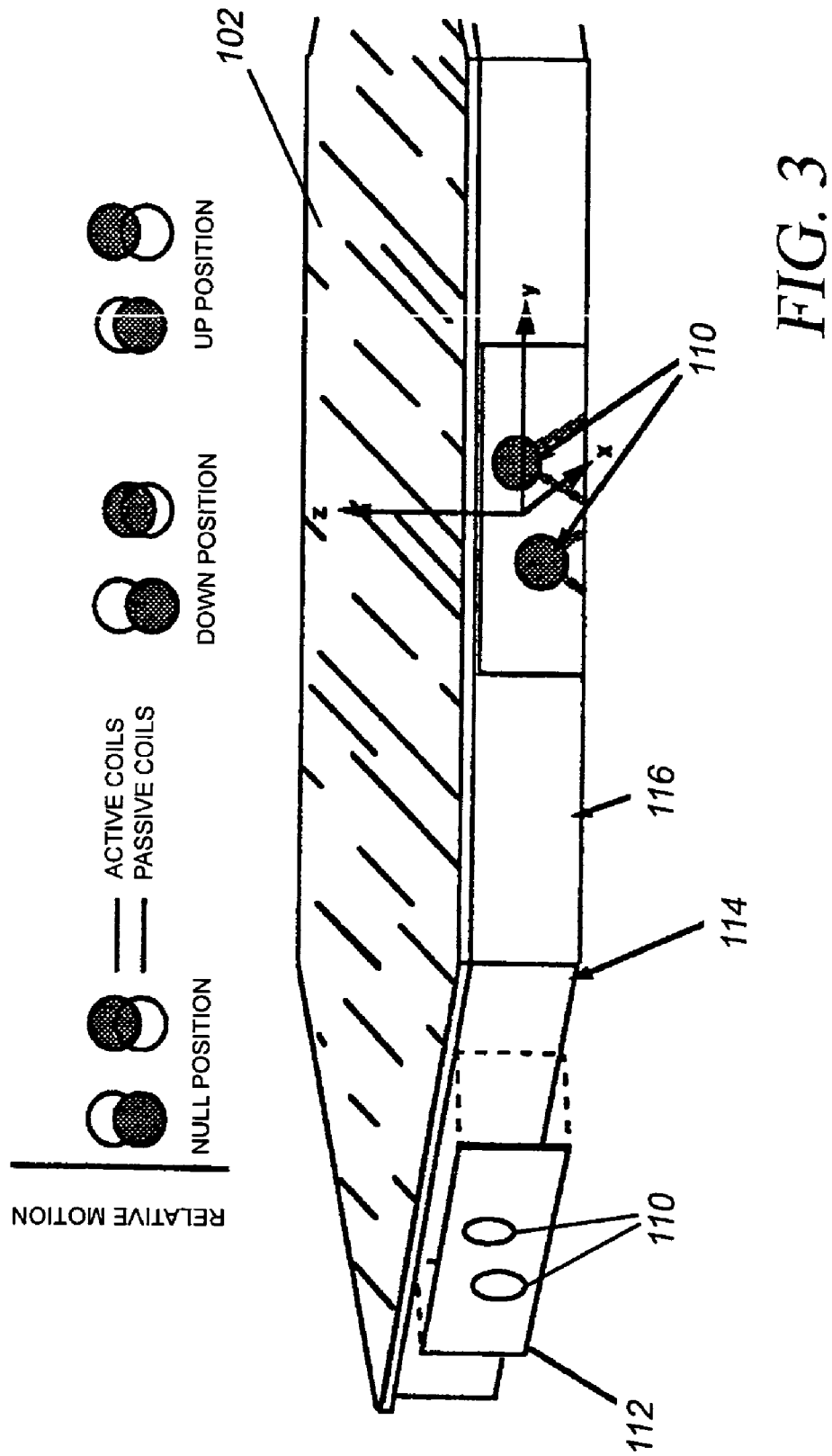
FIG. 3 is an elevated perspective view of a mirror segment supporting a plurality of edge sensor elements.

FIG. 3 is an elevated perspective view of a mirror segment 102 supporting a plurality of edge sensing elements 110. Edge sensing elements 110 may be either passive or active depending upon location. As particularly illustrated, a pair of edge sensing elements 110 are affixed to mirror segment 102 by way of carrier strip 112. Mirror segment 102 has six edges, which are alternately defined as passive edges 114 and active edges 116.

FIG. 3 illustrates that contemporary edge sensing elements 110 transmit information regarding relative motion such as null position, up position or down position. However, this configuration does not provide sensitivity to the GRoC mode. Moreover, sensitivity to GRoC motions is not adequate for current requirements.

Figure 4:
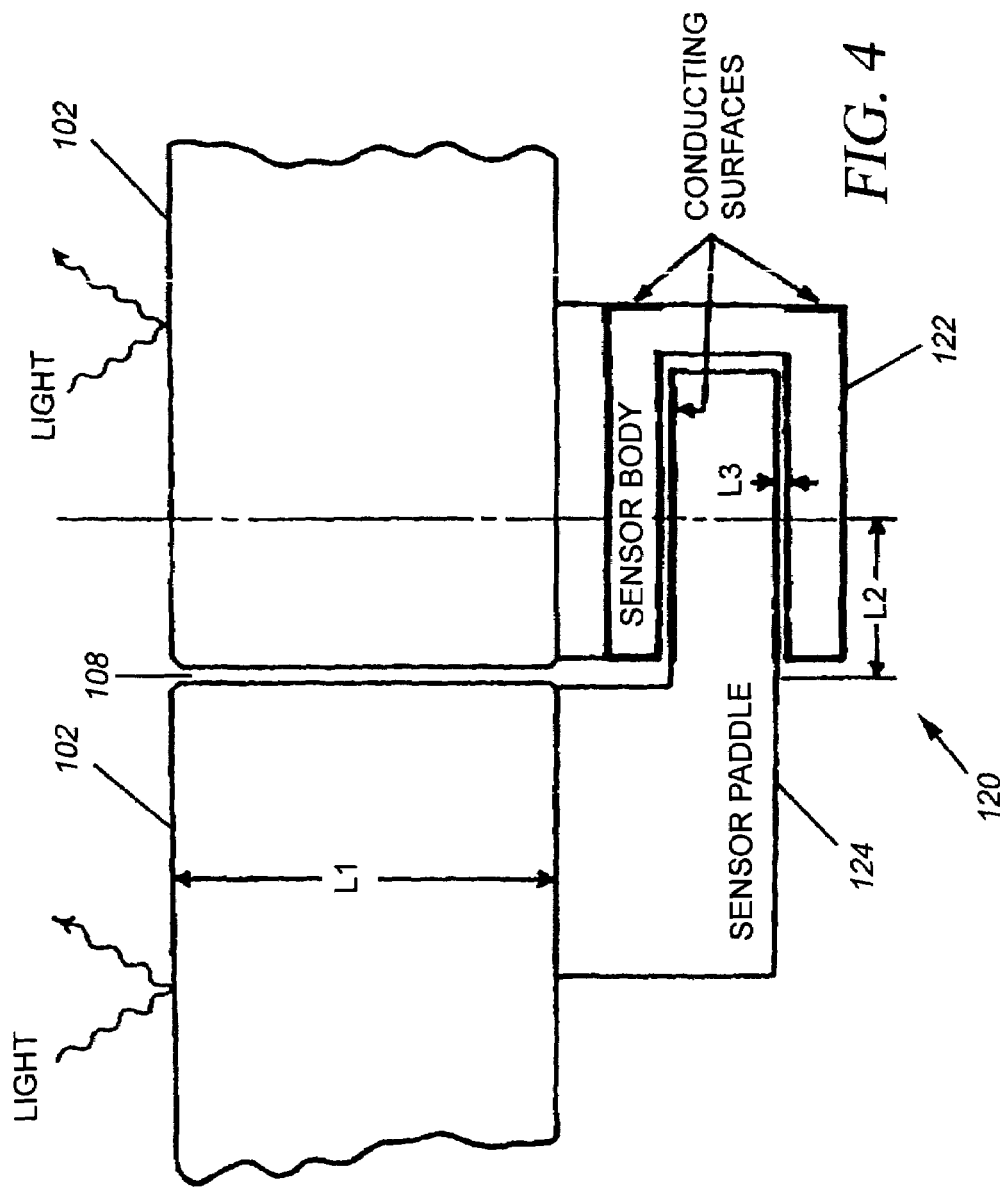
FIG. 4 is a side view of an edge sensor in the form of a capacitive edge sensor, including a sensor body and a sensor paddle.

FIG. 4 is a side view of an edge sensor 120 in the form of a capacitive edge sensor, including sensor body 122 and sensor paddle 124. Each mirror segment 102 has a corresponding thickness "L1" which, in this particular circumstance, is on the order of 7.5 cm. In general, the center of sensor body 122 is disposed a distance "L2" from segment gap 108 between mirror segments 102. The distance "L2" is on the order of 2 cm. The distance "L3" between sensor paddle 124 and sensor body 122 is on the order of 2 mm. Inductive sensors, such as edge sensing element 110 illustrated in FIG. 3, have no sensitivity to GRoC motions because they are only able to sense shear displacements. On the other hand, capacitive sensors, such as edge sensor 120 can sense GRoC motions from z-axis displacements because of the paddle-length offset underneath mirror segment 102. The paddle-length offset makes the transducer sensitive to relative angular displacements between mirror segments. However, a capacitive sensor's sensitivity to GRoC is directly proportional to the length of the offset distance "L2." Because, for many reasons, telescope designers seek to minimize paddle length distance, the GRoC sensitivity of capacitive sensors is limited. Furthermore, the capacitive sensor's GRoC sensitivity is diminished by paddle flexing as the telescope is reoriented to different attitudes with respect to a local gravity vector. However, tilt sensor and inclinometer technology includes sensors that do not have adequate accuracy, range and thermal sensitivity for the requirements of contemporary segmented mirror concepts.

Figure 5:
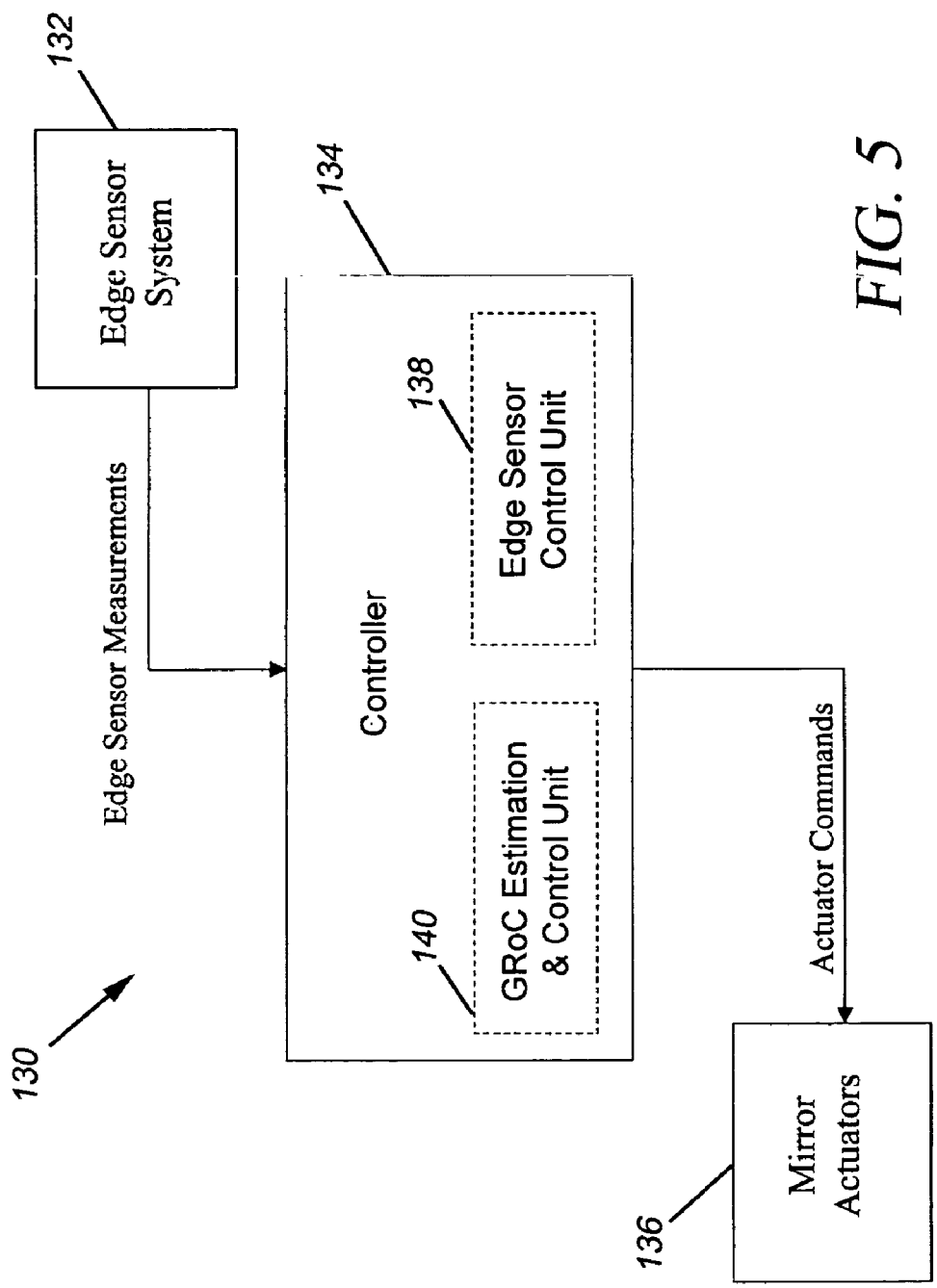
FIG. 5 is a block diagram of a Global Radius of Curvature Estimation and Control System ("GRoCECS") according to an embodiment of the present invention.

FIG. 5 is a block diagram of a Global Radius of Curvature Estimation and Control System ("GRoCECS") 130 according to an embodiment of the present invention. GRoCECS 130 includes an edge sensor system 132, a controller 134, and mirror actuators 136. The edge sensor system 132 comprises all edge sensor transducers, mounts and electronics. The outputs of the edge sensor system 132 are edge sensor measurements. The controller 134 receives the set of edge sensor measurements from edge sensor system 132. The output from controller 134 is a set of mirror actuator commands. Residing on the controller 134 are the edge sensor control unit 138 and GRoC estimation & control unit 140.

According to an embodiment of the invention, GRoCECS 130 uses a conventional edge sensor system, conventional segmented mirror tip/tilt/piston control actuators, and archived edge sensor control commands to estimate the GRoC and control the GRoC to specification. The edge sensor system 132 is used with the tip/tilt/piston actuators to minimize the shear displacements at segment edges. That is, the edge sensor system 132 globally minimizes the edge match error of the entire segmented mirror, thereby providing the best continuity across the segment gaps 108. A control computer keeps track of all control commands executed by the mirror actuators. Meanwhile, in a control loop running at a slower data rate than the edge sensor loop, a GRoCECS method utilizes archived cumulative control commands to compute a set of commands required to maintain proper GRoC.

Figure 6:
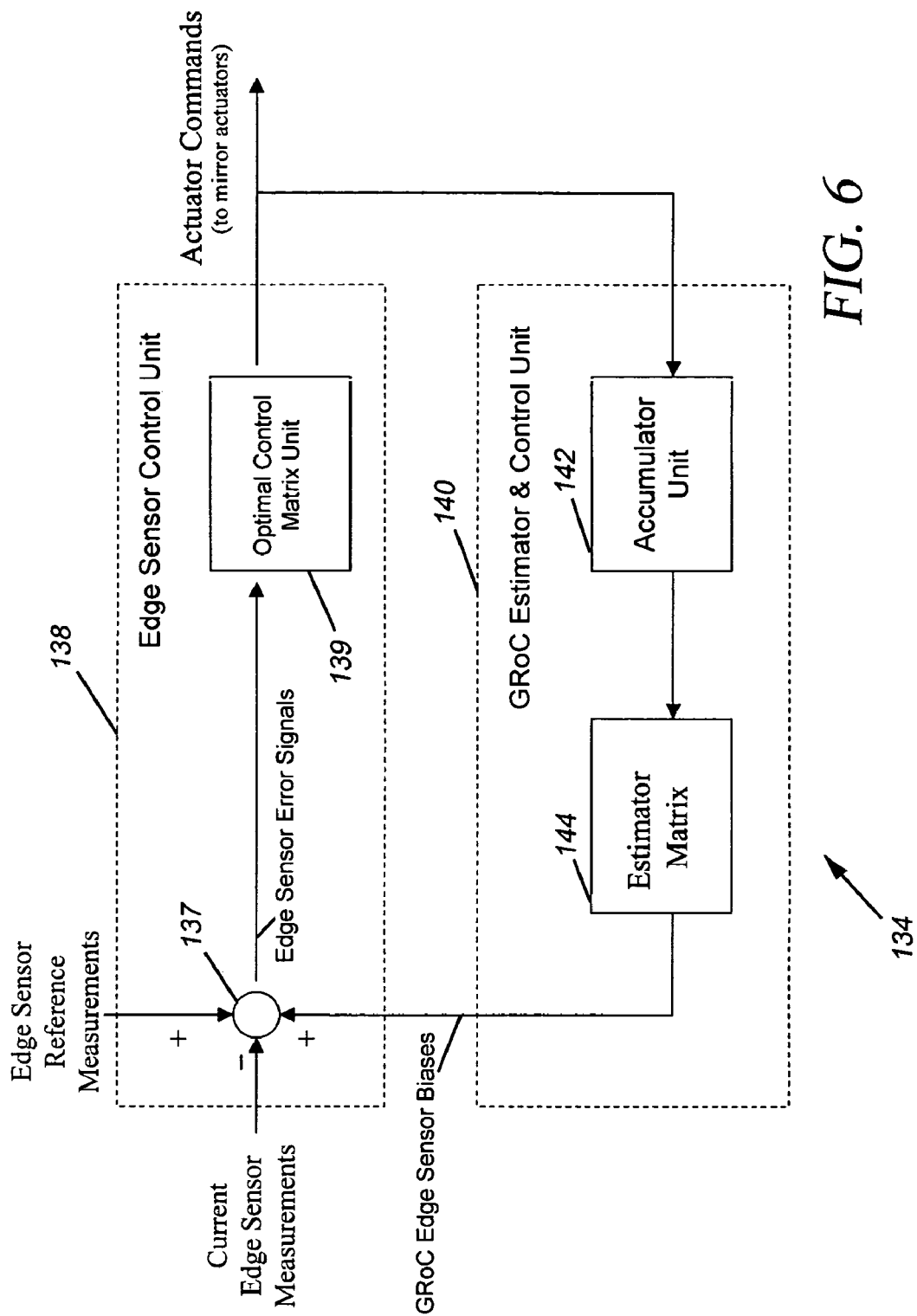
FIG. 6 is a block diagram of a controller illustrating cooperation between an edge sensor control unit and a GRoC estimator & control unit.

FIG. 6 is a block diagram of controller 134 illustrating cooperation between edge sensor control unit 138 and GRoC estimator & control unit 140 according to an embodiment of the invention. Edge sensor error signals are generated by subtracting current edge sensor measurements from corresponding edge sensor reference measurements by way of summation unit 137. The edge sensor error signals are formed into actuator commands (optimal actuator control commands) by way of optimal control matrix unit 139. Usually, the edge sensor reference measurements are recorded when mirror 100 is initially aligned to a desired position. The error signal is augmented by GRoC edge sensor biases that are output from GRoC estimator & control unit 140. The edge sensor control unit 138 outputs the actuator commands to the actuators corresponding to individual mirror segments 102. The actuator commands are also fed back to the GRoC estimator & control unit 140.

Within the GRoC estimator & control unit 140, the current actuator commands are added to accumulated past commands by way of accumulator unit 142. After the commands are accumulated, they are fed into estimator matrix 144. The estimator matrix 144 calculates GRoC edge sensor biases, which are then fed back to summation unit 137 on the next iteration.

The edge sensor control unit 138 operates the following matrix equation:

$$u = K(e_{reference} - e + e_{groc\_bias}) \qquad \text{EQUATION (II.C.1)}$$

The vector "u" contains all the actuator commands for all mirror degrees of freedom except for four prescribed boundary conditions. The vector "$e_{reference}$" contains all edge sensor measurements recorded when the mirror reference was set. The vector "e" contains all the edge sensor measurements at the current sample interval. The vector "$e_{groc\_bias}$" contains all edge sensor biases computed by GRoC estimator & control unit 140 on the last iteration. The matrix "K" is an optimal edge sensor control matrix. The edge sensor error signals, determined from the edge sensor reference measurements, the current edge sensor measurements, and the GRoC edge sensor biases, is multiplied by the optimal edge sensor control matrix "K" to obtain mirror actuator commands "u." Besides being sent to the mirror actuators, the command vector "u" is returned to GRoC estimator & control unit 140.

Figure 7:
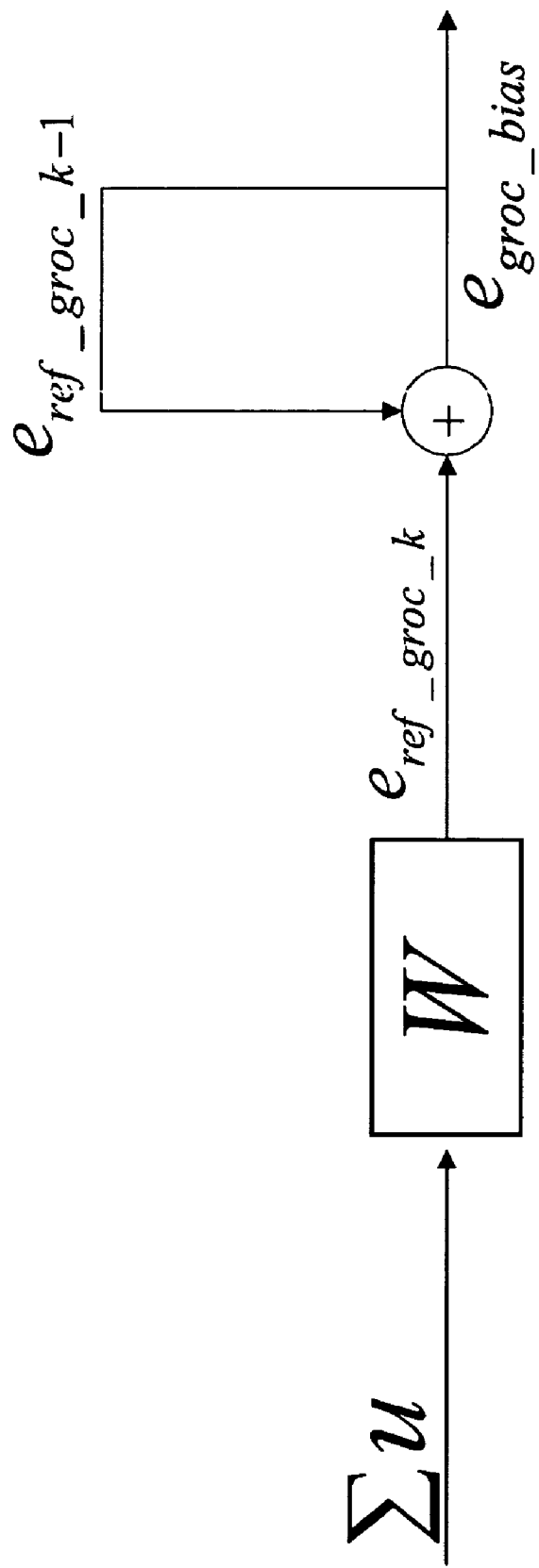
FIG. 7 is a flow diagram showing a flow internal to the GRoC estimator and control unit.

FIG. 7 is a flow diagram illustrating a flow internal to the GRoC estimator & control unit 140. First, GRoC estimator & control unit 140 adds the current actuator commands at time interval "k" to the accumulated commands updated at the last interval "k−1." Equation (II.C.2) illustrates the summation operation:

$$\sum u_k = \sum u_{k-1} + u_k \qquad \text{EQUATION (II.C.2)}$$

After the summation is complete, the accumulated control commands are premultiplied by the estimator matrix "W" in order to calculate the GRoC-based edge sensor biases, which are then output to edge sensor control unit 138.

After vectors "u" are summed to provide an accumulation of control commands, the values are stored in accumulator unit 142. The estimator matrix "W" is then multiplied by the accumulated commands at interval "k." Equation (II.C.3) describes this operation:

$$e_{\text{ref\_groc\_k}} = W\left(\sum u\right)_k \qquad \text{EQUATION (II.C.3)}$$

The output vector "$e_{ref\_groc\_k}$" is an intermediate edge sensor bias value that corresponds to the change in GRoC since the last data interval "k−1." The intermediate bias is then added to the accumulated GRoC-based edge sensor bias in Equation (II.C.4).

$$e_{groc\_bias} = e_{ref\_groc\_k} + e_{ref\_groc\_k-1} \qquad \text{EQUATION (II.C.4)}$$

The vector "$e_{groc\_bias}$" is the edge sensor bias that is added to the edge sensor error signal in the edge sensor control loop. After the bias is updated, the bias at interval "k" is assigned to "$e_{ref\_groc\_k-1}$" for the next cycle of the loop, as illustrated in Equation (II.C.5).

$$e_{ref\_groc\_k-1} = e_{groc\_bias\_k} \qquad \text{EQUATION (II.C.5)}$$

The GRoCECS provides a combination of inherent mathematical structures of the edge sensor control gain matrix "K" and the estimator matrix "W."

Figure 8:
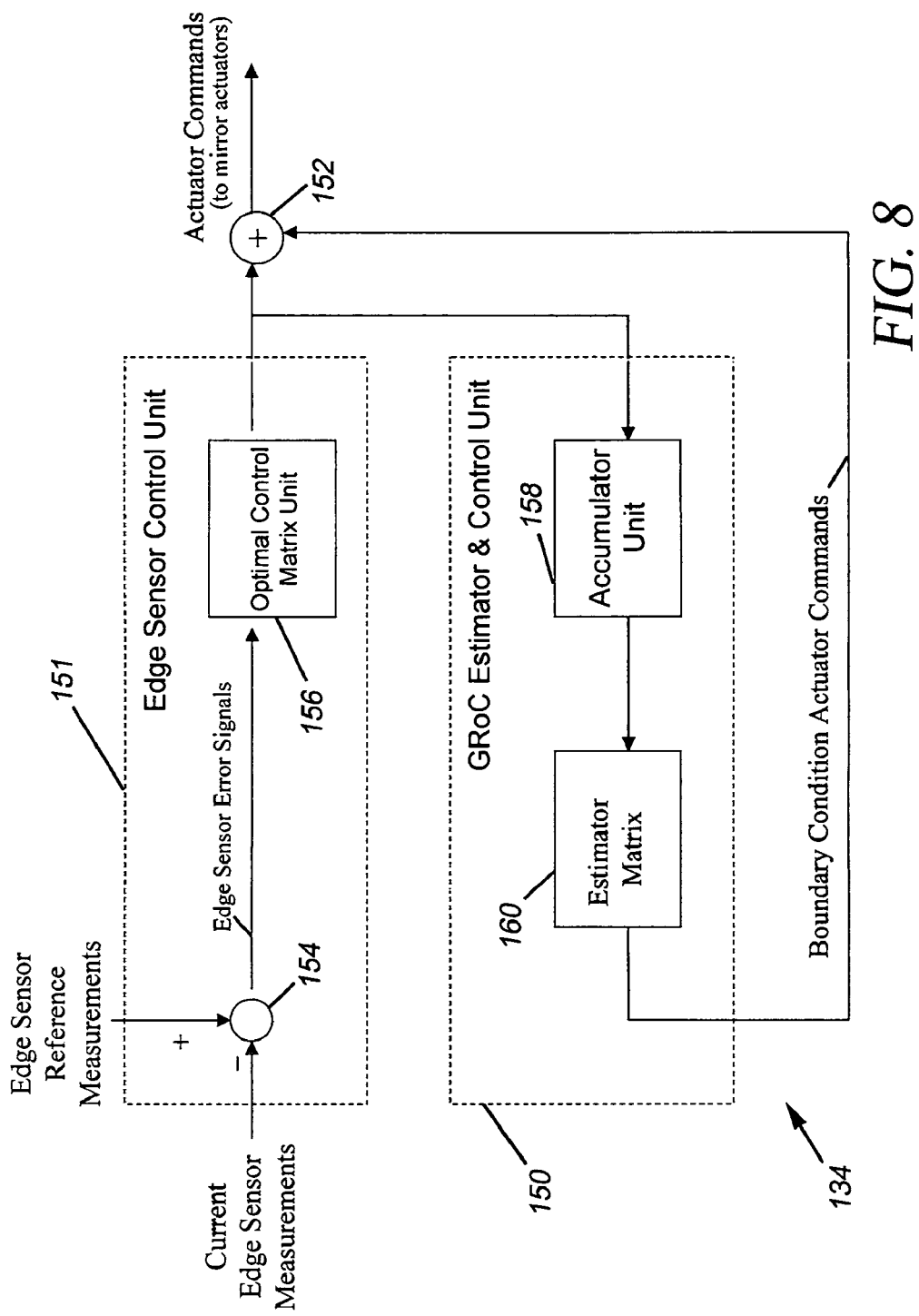
FIG. 8 is a block diagram of controller according to another embodiment of the present invention.

FIG. 8 is a block diagram of controller 134 according to another embodiment of the present invention. As illustrated, current edge sensor measurements are subtracted from edge sensor reference measurements by way of summation unit 154. This data is then forwarded as edge sensor signals to optimal control matrix unit 156.

GRoC estimator & control unit 150 includes an accumulator unit 158 and estimator matrix 160 as in the embodiment of FIG. 6. However, instead of calculating edge sensor biases and injecting them into the edge sensor error signal (as in FIG. 6), the GRoC estimator & control unit 150 outputs boundary condition actuator commands. The boundary condition actuator commands are then added to the rest of the actuator commands by way of summation unit 152 and then sent to the mirror actuators. According to this embodiment, boundary condition actuator commands are open-loop with respect to the edge sensor control loop. That is, there is no feedback on the positioning of the boundary conditions unless there is some external sensing mechanism associated with the boundary condition mirrors and actuators.

The following method exploits the feedback control capability inherent to the edge sensor control system to adjust the GRoC mode. The supportive theory for the Global Radius of Curvature Estimation and Control System ("GRoCECS") includes two main parts. The first part is the derivation of the optimal control for the edge sensor system by itself. The second part is the derivation of the GRoC estimator and how it is interlaced with the edge sensor control system. The supportive theory provides a derivation of the optimal edge sensor control system.

The derivation of the optimal edge sensor control matrix also includes two main parts. The first part is a derivation of the equations relating the edge sensor measurements to the tip, tilt and piston degrees of freedom of segmented mirror 100. The second part utilizes those relationships to derive the optimal control matrix.

Referring again to the segment configuration of FIG. 2, each "x" denotes the location of an "active" edge sensor element 105. Each "o" denotes the location of a "passive" target edge sensor element 106. Mathematical expressions are then developed for the vertical distance (along the z-axis) between each "x" and its corresponding "o" on an adjacent segment 102.

Each segment 102 has three actuators such that the segment is free to rotate about the x-axis ($\theta x$), rotate about the y-axis ($\theta y$), and translate along the z-axis ($z$). The actuators are configured in such a way that rotations cause no net z-axis translation. Each segment's motion is referenced to an inertial coordinate frame having a corresponding origin at the centroid of the segment when the segment is in the null position.

Figure 9:
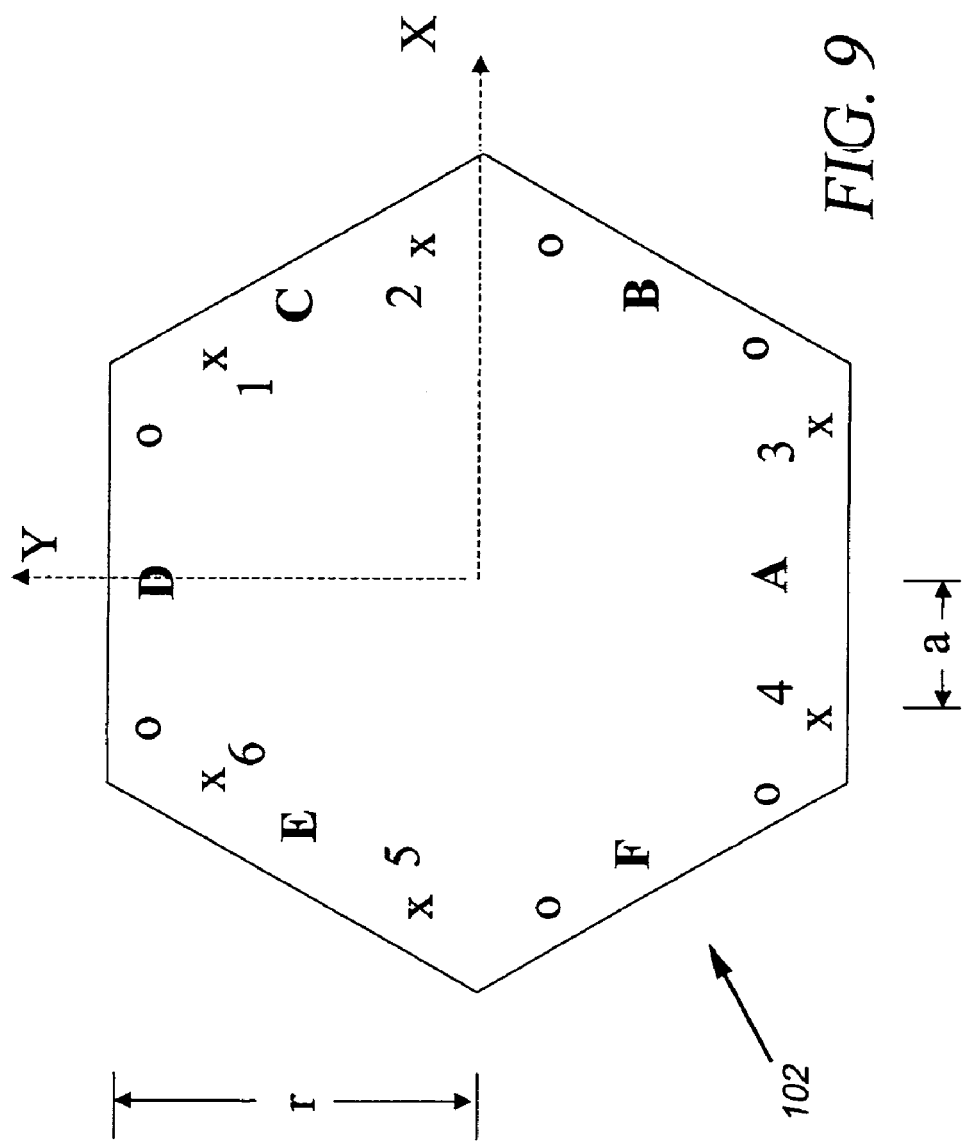
FIG. 9 is a schematic view of a single mirror segment according to an embodiment of the present invention.

FIG. 9 is a schematic view of a single mirror segment 102 according to an embodiment of the present invention. Each face of segment 102 is denoted by letters A–F. The parameter "r" is the distance from the centroid of the segment to the edge along the y-axis. In other words, "r" is one-half of the flat-to-flat segment width. The parameter "a" is the distance from the segment centroid to the Face A active edge sensor element along the x-axis.

For the purpose of formulating the governing equations, the "active" sensing element is located at each "x" on FIG. 9 and the "passive" target element is located at each "o." In deriving the governing equations, all rotations and translations are indicated as very small (on the scale of microradians and micrometers). For such small perturbations, it is not necessary to utilize Euler angles. For such small angles the approximation $$\sin(\theta)=\tan(\theta)=\theta$$

is valid. The geometry and parameters described in FIG. 2 and FIG. 9 are used to derive the equation for an edge sensor on Face A. The equations that govern the edge sensor outputs on Face A are the following:

$$e_4 = z_i - z_j - r\theta_{xi} + a\theta_{yi} - r\theta_{xj} - a\theta_{yj} \qquad \text{EQUATION (II.E.1)}$$

$$e_3 = z_i - z_j - r\theta_{xi} - a\theta_{yi} - r\theta_{xj} + a\theta_{yj} \qquad \text{EQUATION (II.E.2)}$$

The index "i" refers to the segment on which the active or sensing element (denoted by "x") resides. The index "j" refers to the neighboring segment on which the passive or target element (denoted by "o") resides. All other variables in equations (II.E.1) and (II.E.2) have already been defined above.

The symmetry of regular hexagonal segments and the repeatability of their layout works favorably for automated generation of equations for the entire segmented mirror array. Equations for edge sensors on Faces C and B are generated by rotating equations (II.E.1) and (II.E.2) by successive 120-degree coordinate transformations.

Because the edge sensor equations are all linear, the edge sensor equations can be expressed in matrix form as a function of the tip, tilt and piston degrees of freedom:

$$e = Cx \qquad \text{EQUATION (II.E.3)}$$

In this equation, "e" is a (number of sensors)×1 column vector of edge sensor outputs. The column vector "x" has dimension (number of degrees of freedom)×1 and comprises the tip, tilt, and piston degrees of freedom of all of the segments in the array. The matrix "C" is the matrix of coefficients with dimension (number of sensors)×(number of degrees of freedom). The matrix "C" relates the degrees of freedom to the edge sensor measurements. The matrix "C" is also referred to as the "influence matrix."

Equation (II.E.3) is generated by equations (II.E.1) and (II.E.2) and the appropriate coordinate transformations.

After a system of equations has been derived to describe how the edge sensors detect relative segment motions, the optimal control matrix is derived. An optimal control system aims to minimize the following performance metric:

$$J = (e_{ref} - e)^T (e_{ref} - e) \qquad \text{EQUATION (II.E.4)}$$

The vector "e" is of dimension (number of sensors)×1 and contains all of the edge sensor measurements. The vector "$e_{ref}$" is the (number of sensors)×1 vector of edge sensor reference measurements. The performance metric "J" is the global variance of the edge sensor errors over the entire mirror array. The control system aims to minimize "J" by the method of least squares by the following equation:

$$u = (C^T C)^{-1} C^T (e_{ref} - e) \qquad \text{EQUATION (II.E.5)}$$

The column vector "u" is a vector with dimension (number of degrees of freedom)×1, which comprises the optimal control commands for tip, tilt, and piston.

So long as the C-matrix is full rank, one can obtain a unique solution for the control commands to minimize the edge match errors. Unfortunately, the (number of sensors)×(number of degrees of freedom) C-matrix is not full rank. Its rank is only number-of-degrees-of freedom−4. Thus ($C^T C$) is not invertible. The four vectors in the null space of "C" correspond to the global tip, tilt, piston and radius-of-curvature modes of the entire segmented mirror. The only way a unique, optimal edge-matching control can be derived is to introduce four constraints (also called boundary conditions) into the mathematical problem of minimizing the cost function "J." The four boundary conditions allow for full observability and controllability for matching up segment edges, but the four global modes remain unobservable and uncontrollable. The GRoC estimator & control unit, in estimating the boundary condition motion, not only estimates the magnitude of the GRoC mode, but also provides observability and controllability of all the global modes.

Figure 10:
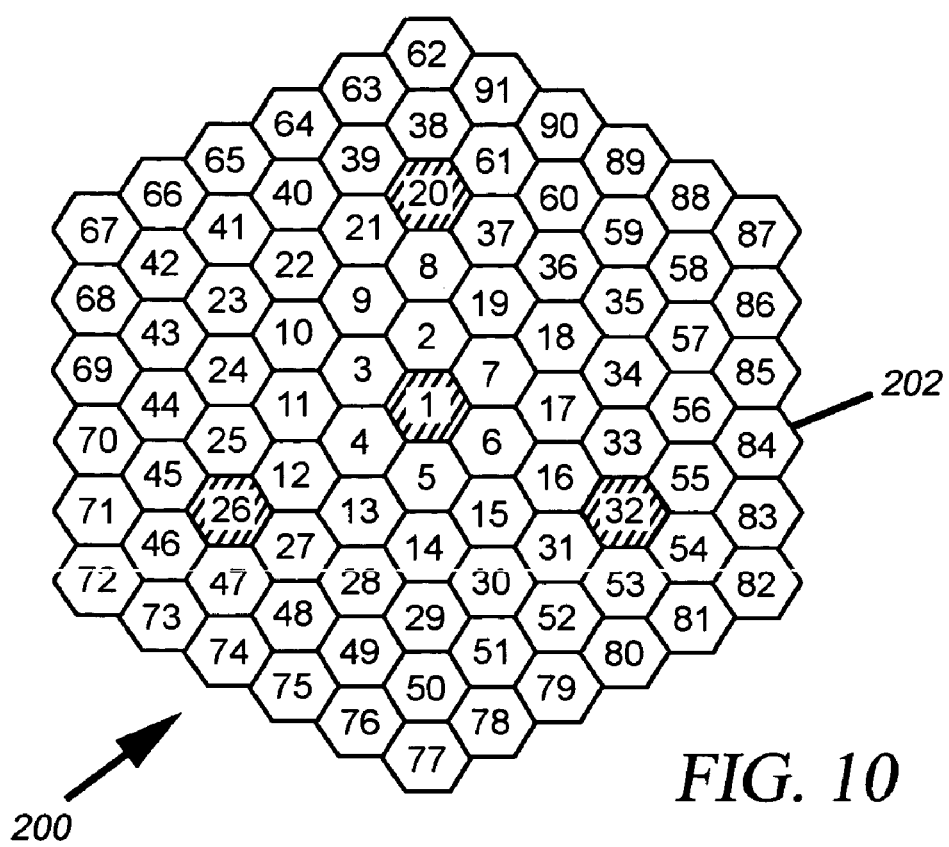
FIG. 10 is a schematic view of a segmented mirror tiled with a plurality of hexagon segments according to an embodiment of the invention.

FIG. 10 is a schematic view of segmented mirror 200 tiled with a plurality of hexagon segments 202. In order to obtain a unique edge match control, four boundary conditions are selected. Segments 1, 20, 26 and 32 in FIG. 10 are mathematically constrained in their piston degree-of-freedom. The four boundary conditions, as do any four non-collinear points, define a sphere. The edge-matching control system will try to minimize the edge mismatch along the sphere defined by the four boundary conditions. If the four boundary conditions move due to external disturbances, the radius and orientation of the reference sphere changes.

After applying the boundary conditions, the C-matrix dimension becomes (number of sensors)×(number of degrees of freedom–4), and the rank is number-of-degrees of freedom–4. The new C-matrix, with boundary conditions imposed, is denoted as $C_{BC}$. Next, by applying the boundary conditions, the columns of the C-matrix which correspond to the boundary condition degrees-of-freedom are removed. Then $(C_{BC}{}^T C_{BC})$ is invertible and the unique edge sensor control matrix "K" is defined as follows:

$$K = (C_{BC}{}^T C_{BC})^{-1} C_{BC}{}^T \qquad \text{EQUATION (II.E.6)}$$

Then the applied optimal control command is:

$$u = K(e_{ref} - e) \qquad \text{EQUATION (II.E.7)}$$

This time "u" is a (number of degrees of freedom–4)×1 vector, "K" is a (number of degrees of freedom–4)×(number of sensors) matrix, and the edge sensor and edge sensor reference vectors are still (number of sensors)×1. Because "u" is only (number of degrees of freedom–4)×1, the controller always issues zero commands for the four boundary condition degrees-of-freedom.

Equations (II.E.1) to (II.E.7) illustrate the derivation of the optimal control to minimize the global variance of the edge match errors. The following discussion details the application of the open-loop influence matrix "C," the edge sensor control matrix "K," and the four boundary conditions to the derivation of the GRoC estimator & control unit.

In developing the theory for the GRoC estimator & control unit, it is useful to look at how disturbances in the state vector "x" map into control commands in "u." Equations (II.E.3) and (II.E.7) are combined to give the following relationship in equation (II.E.8).

$$u = KC(x_{ref} - x) = KC(\Delta x) \qquad \text{EQUATION (II.E.8)}$$

Equation (II.E.8) gives a mapping from any perturbation of the degree-of-freedom vector "x" to the optimal edge-matching control command "u." The vector "Δx" contains all the perturbations to the mirror tip, tilt and piston states and has dimension (number of degrees of freedom)×1. The edge sensor matrix "K" is the same (number of degrees of freedom–4)×(number of sensors) matrix defined in equation (II.E.6). The matrix "C" is the full-array influence matrix of dimension (number of sensors)×(number of degrees of freedom) defined in equation (II.E.3).

Because equation (II.E.8) defines a closed-loop relationship between state disturbances and control commands, a closed-loop influence matrix can be defined. The closed-loop influence matrix, "Q," is defined in equation (II.E.9):

$$Q = KC \qquad \text{EQUATION (II.E.9)}$$

The closed-loop influence matrix, "Q," has dimension (number of degrees of freedom–4)×(number of degrees of freedom). "Q" maps dynamic perturbations in the states "x" to control commands in "u." Any conceivable perturbation in "x" maps into zero control motions of the boundary condition degrees of freedom. In fact, boundary condition perturbations in "x" map to GRoC-mode motions in "u." Deeper scrutiny of "Q" reveals that "Q" has a special mathematical quality as shown in equation (II.E.10).

$$Q = (-I \, q) \qquad \text{EQUATION (II.E.10)}$$

Equation (II.E.10) shows that "Q" can be partitioned into two sub-matrices. The first partition is simply the negative of the identity matrix of dimension (number of degrees of freedom–4)×(number of degrees of freedom–4). The first partition simply maps disturbances in each active degree of freedom to the same value, except negative, in the control. The mathematics describes the negation of the sensed disturbance, which is what closed-loop control is supposed to do. The second partition, "q," is a matrix with dimension (number of degrees of freedom–4)×4. The columns of "q" are each a GRoC-mode vector which the control system responds with when the boundary condition degrees of freedom are perturbed. "Q" also has rank equal to number-of-degrees-of-freedom–4.

Combining equations (II.E.8) and (II.E.9) yields equation (II.E.11)

$$u = Q(\Delta x) \qquad \text{EQUATION (II.E.11)}$$

Equation (II.E.11) implies that one could estimate the perturbations in "x" by performing a pseudo-inverse of "Q" and multiplying it to the control commands "u." If one accumulates all past control commands, one can apply the pseudo-inverse to estimate the accumulated perturbations to the states "x." Equation (II.E.12) describes application of the pseudo-inverse of "Q."

$$Q^+ \sum u = Q^+ Q \sum \Delta \hat{x} \qquad \text{EQUATION (II.E.12)}$$

"$Q^+$" is the pseudo-inverse of "Q." The pseudo-inverse of "Q" was evaluated by singular value decomposition ("SVD") because $Q^T Q$ which has dimension (number of degrees of freedom)×(number of degrees of freedom), has rank of only number-of-degrees-of-freedom–4. Thus $Q^T Q$ is not invertible, and the classic pseudo-inverse formula cannot be utilized in this situation. Pseudo-inverse by SVD is appropriate under these circumstances. If $Q^T Q$ were full rank, then a unique "$Q^+$" could be evaluated, and the following equations would hold:

$$Q^+ Q = I \qquad \text{EQUATION (II.E.13)}$$

$$Q^+ \sum u = \sum \Delta \hat{x} \qquad \text{EQUATION (II.E.14)}$$

Thus, if $Q^T Q$ were full rank, then $Q^+ Q$ would be the identity matrix "I." In this case, "$Q^+$" would be an estimator that would yield unique estimates of the state disturbances in "x." However, this is not the case because $Q^T Q$ is not full rank. If $Q^+ Q$ were very close to the identity matrix, then one could assert:

$$Q^+ \sum u \cong \sum \Delta \hat{x} \qquad \text{EQUATION (II.E.15)}$$

Equation (II.E.15) then yields an approximate estimate of all states in "x." The states of most particular interest are the states corresponding to the piston degrees of freedom of the four boundary condition segments. The quality and accuracy of the estimates depend on how closely $Q^+Q$ approximates the identity matrix. A good figure of merit for determining how closely one is to the identity matrix is the root-mean-square (RMS) of the diagonal elements of the identity matrix minus $Q^+Q$.

FIG. 11 is a table illustrating a figure of merit for five conceivable configurations of hexagonally segmented primary mirrors. For a single ring of hexagonal mirror segments, the anticipated error in the estimates is 20 percent. The ratio of null space vectors to the larger dimension of the "Q" matrix is 4/21, approximately 20 percent. Also, the error term gets smaller as the number of rings and the number of segments increase. The error appears to decline asymptotically. At five rings and 91 segments, the error term is only 2 percent. The ratio of null space vectors to the large dimension in the 5-ring case is 4/273, approximately 1.5 percent. The trends in the table of FIG. 11 suggest that as $Q^+Q$ approaches, in the limit, a squarer full rank matrix, the error in the estimator, in the limit, goes to zero.

Once the states of the boundary condition motions have been estimated, they are easily converted to edge sensor biases to the control system as shown in equation (II.E.16).

$$e_{bias} = -C_{BC} Q U_{bc} Q^+ \sum u \qquad \text{EQUATION (II.E.16)}$$

After applying the pseudoinverse of "Q" to the accumulated control commands, the state estimates of all states are obtained. For the GRoC correction, only the four boundary condition states are of interest. "$U_{bc}$" is a (number-of-degrees-of-freedom)×(number-of-degrees-of-freedom) diagonal matrix of all zeros except for ones on the diagonal corresponding to where the boundary condition degrees of freedom are. The function of "$U_{bc}$" is to eliminate the estimates of the other non-boundary condition states while preserving the estimates of the boundary conditions. Then closed-loop influence matrix "Q" operates on the four boundary condition degrees of freedom to compute the control commands in response to motions of the boundary conditions. The resulting commands are GRoC spatial mode vectors to offset the GRoC induced in the primary mirror due to boundary condition motion. Finally, the reduced open-loop influence matrix $C_{BC}$ is applied to convert the GRoC vector commands to the appropriate edge sensor biases. The negative sign in Equation II.E.16 indicates that the edge sensor biases will negate the GRoC motion that had been induced previously. Equation II.E.16 can be simplified as follows in Equation II.E.17:

$$e_{bias} = W \sum u \qquad \text{EQUATION (II.E.17)}$$

The estimator matrix "W" is defined by equation II.E.18:

$$W = -C_{BC} Q U_{bc} Q^+ \qquad \text{EQUATION (II.E.18)}$$

Thus, the estimator is derived to estimate all the tip, tilt and piston states of a segmented mirror. The estimator is shown to improve with accuracy as the number of segments (rings of hexagons) increases. The special properties of the estimator are a consequence of several things. The selection of the four, sphere-defining, boundary conditions provides the derivation. The boundary condition selection drives what the optimal edge sensor control matrix "K" will be. The boundary condition selection also drives the special mathematical properties inherent in the closed-loop influence matrix "Q."

The GRoCECS includes two primary features. The first feature provides a way of sensing the degrees of freedom, which are unobservable by an edge sensor system, without having to add additional hardware metrology systems. The GRoCECS utilizes all the information available from an integrated edge sensor control system in a unique manner to estimate all the states of the segmented mirror. The second feature is that the GRoCECS improves in accuracy as the number of segments in the segmented mirror increases.

The GRoCECS provides mathematical algorithms that are easily adaptable and scalable to larger or smaller systems. The GRoCECS, is preferably implemented in software, and is thus insensitive to temperature and other environmental conditions that would introduce errors into a hardware-based sensing system. The GRoCECS is a unique software product that uses existing edge sensing and mirror actuation systems. To implement the GRoCECS, only the interfaces between the GRoCECS and the existing hardware need to be established properly. The supporting theory shows that the mathematics of the estimator is scalable to any size system, and the generation of the governing equations is easily automated.

FIG. 11 is a table illustrating inherent estimator error. The dominant error source in the GRoCECS is the error from the inherent underdetermined structure of the estimator matrix. The far right column in the table of FIG. 11 gives the amount of expected inherent error corresponding to the number of segments in the primary mirror.

For a single ring of seven hexagonal segments, the expected estimator error is 20 percent. For a 5-ring array of 91 hexagonal segments, the expected estimator error is only 2 percent.

GRoCECS performance was experimentally verified in testing at McDonald Observatory on the Hobby-Eberly Telescope(HET). The HET has 91 hexagonal segments in its primary mirror. The HET is equipped with an edge sensor system whose architecture is identical to the configuration for which the GRoCECS was derived. Each HET mirror has actuators mounted to it to effect three degrees of freedom: tip, tilt and piston. The GRoCECS system was integrated with the edge sensor control system and primary mirror control system as previously illustrated in FIG. 6.

Figure 12:
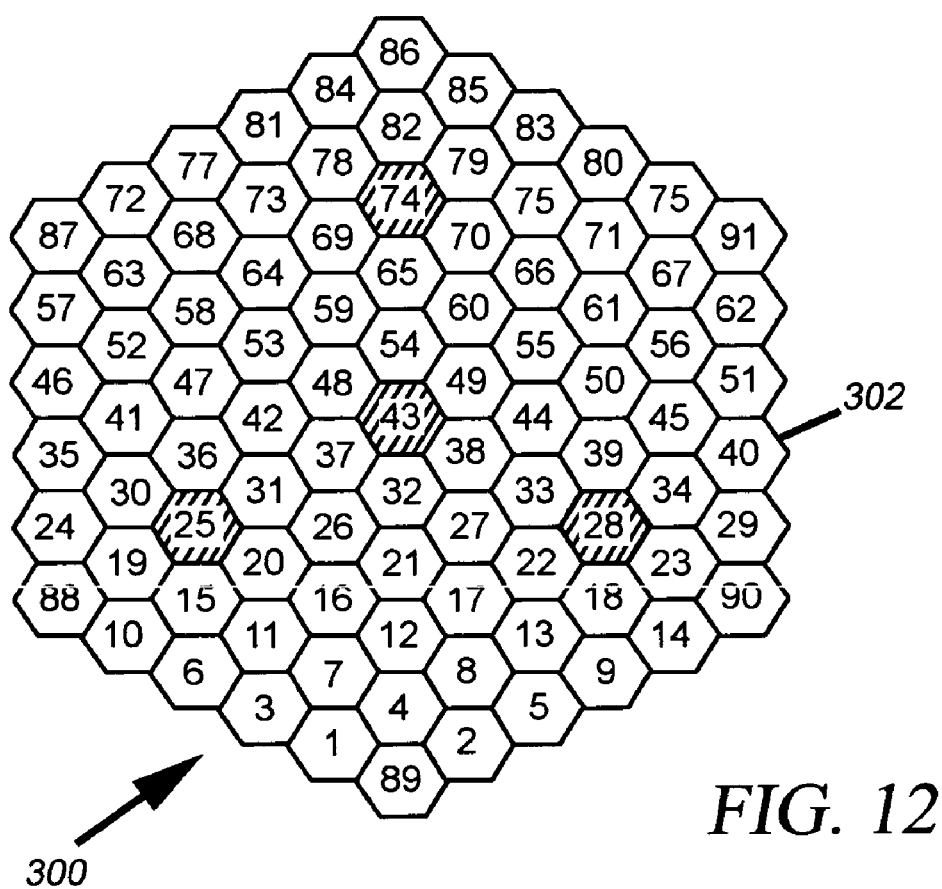
FIG. 12 is a schematic view of a segmented mirror tiled with a plurality of hexagon segments according to an embodiment of the invention.

FIG. 12 is a schematic view of a segmented mirror 300 tiled with a plurality of hexagon segments 302. Segments 43, 74, 25 and 28 were prescribed as the boundary conditions for the edge sensor control system and for the GRoC estimator. The verification testing was conducted in two parts. The first part was a test in which the edge sensor control system operated but the GRoC estimator & control unit was not operational. This test was a baseline test to observe how the radius of curvature changed without the estimator active. The second test involved the entire GRoCECS being operational to verify its actual performance.

The same experimental procedure was followed for each test. The telescope operator commanded segment 43 to move in its piston degree of freedom in 2-micron increments. After each 2-micron move, the control system was allowed to settle out any transients, and the telescope operator then measured the change in the position of the telescope's focus. The telescope operator commanded segment 43 to positions of +2, +4, +6, and +8 microns. The telescope operator then moved segment 43 back to +6, +4, +2, and zero microns (home). Theory predicted that, with the GRoCECS inactive, the focus position would change approximately 300 microns per every 2 microns of piston in segment 43. When the GRoCECS is active, the focus position should not change, or its change should remain within the HET's tolerance for GRoC.

Figure 13:
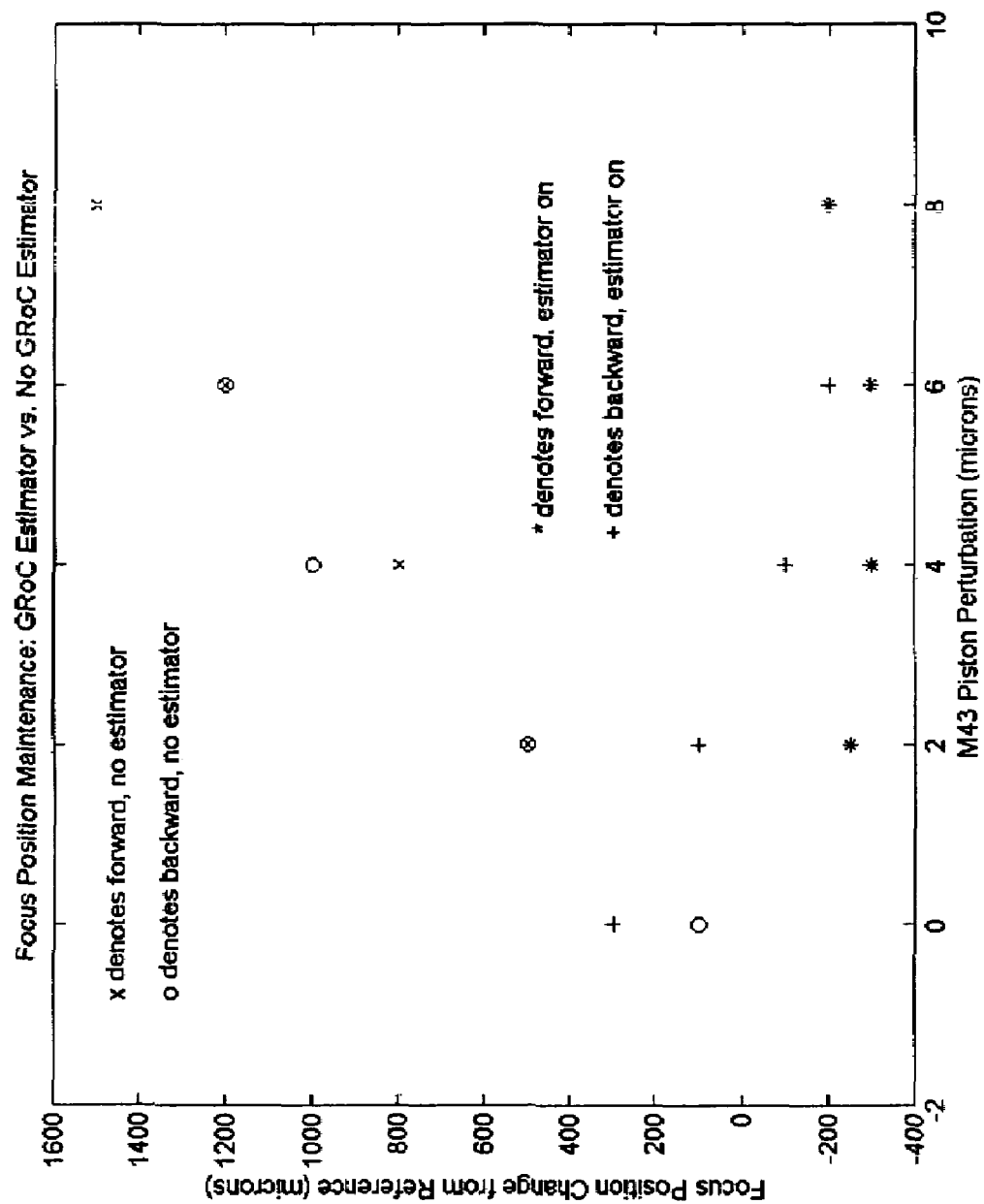
FIG. 13 is a graph illustrating a focus position change test during performance verification.

FIG. 13 is a graph illustrating the results of two tests. The data points identified by the "x" and the "o" are the data taken when the GRoCECS was not active. The estimator-off test yields a slope of approximately 375 microns focus change per 2 microns of segment 43 piston motion. The "*" and the "+" identify the data points taken when the GRoCECS was activated. The estimator-on forward test has virtually no slope, while the estimator-on backward test yields at most a slope of −150 microns focus change per 2 microns of segment 43 motion. The direction of the slope was reversed from the estimator-off test, indicating that the GRoCECS had overcompensated for GRoC changes. The estimator-on test maintained the GRoC to within +300 microns of the reference position. The GRoC maintenance specification on the HET is ±300 microns.

The focus position change test indicated that the GRoCECS had actually affected the telescope's ability to maintain focus at the correct radius of curvature. The focus position data are best at telling what the performance is like subject to large disturbances. Errors in focus position measuring metrology, as well as errors in open-loop commanding segment 43 motions, contribute greatly to the ability to measure the focus position accurately. The ability to measure focus position had an accuracy of ±100 microns. A better figure of merit for evaluating the GRoCECS performance is to compare what the estimator actually estimated segment 43's motions to be versus what the edge sensors actually measured its motion was. Data of this nature would truly prove the GRoCECS's ability as a full-state estimator and controller, especially since the edge sensors are accurate to better than 50 nanometers.

Figure 14:
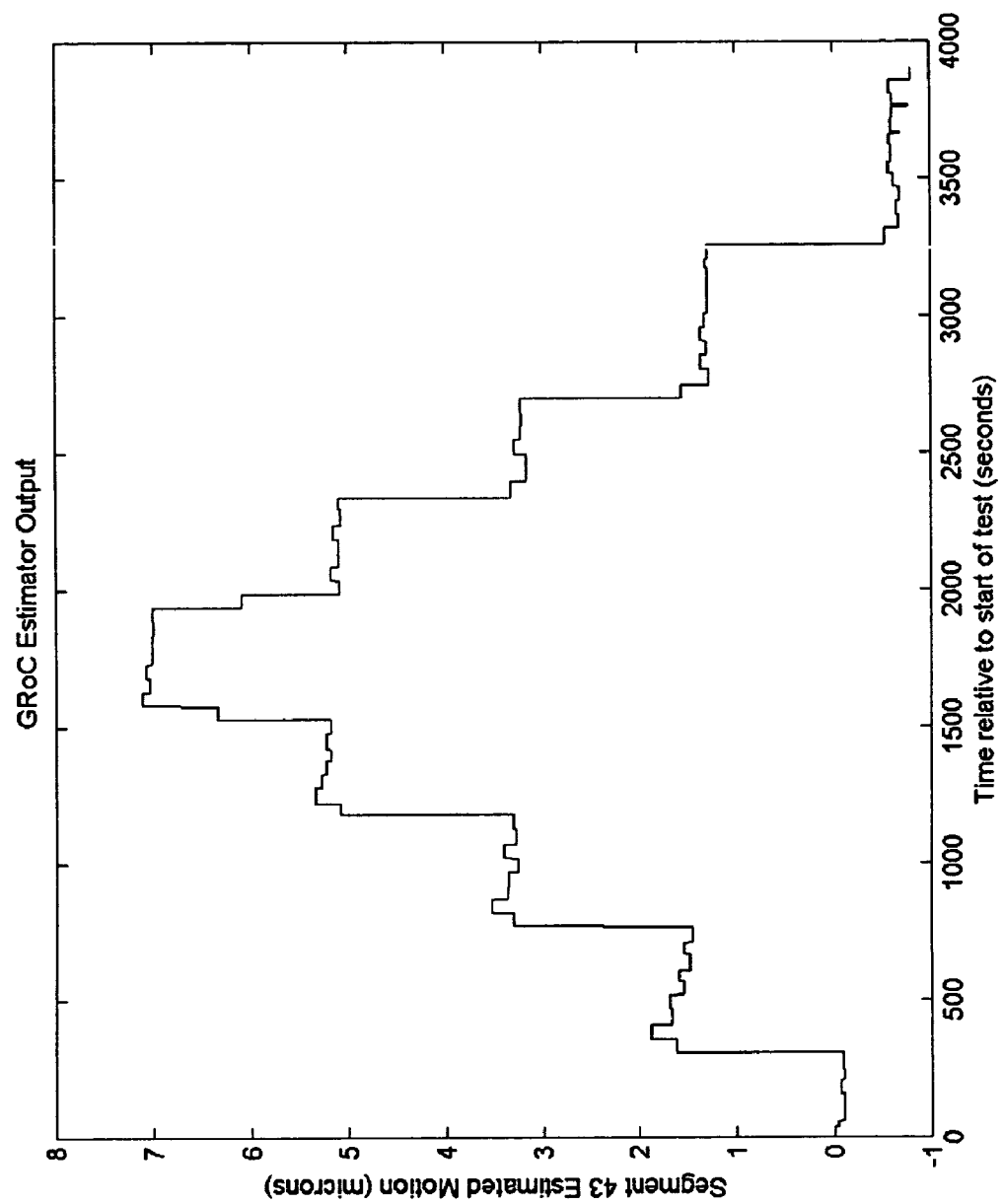
FIG. 14 is graph of a plot predicting piston motion of segment 43.

FIG. 14 is a graph of what the estimator estimated segment 43's piston motion to be.

Figure 15:
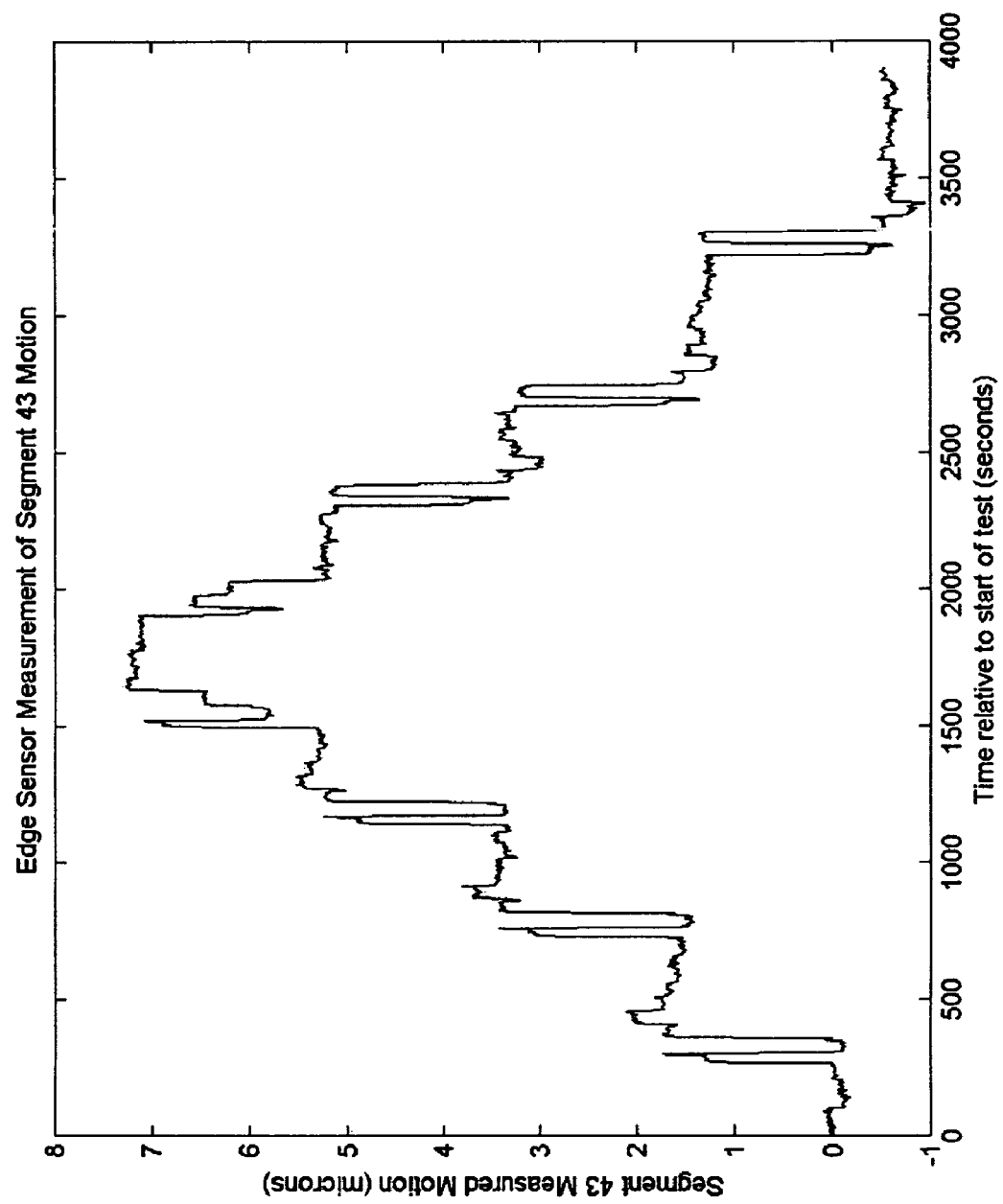
FIG. 15 is a graph providing the mean of actual measurements from the edge sensors surrounding segment 43.

FIG. 15 is a graph providing the mean of the actual measurements from the edge sensors surrounding segment 43.

The estimator very precisely compares with the edge sensor outputs. The edge sensors indicate that segment 43 moved in piston by about 1.75 microns per step even though the telescope operator commanded 2 microns per step. The discrepancy arises from the fact that, on HET, when segments are moved open-loop, they don't go precisely where they are commanded to go. The edge sensor outputs show a small transient at the start of every commanded step. The transient originates from the fact that the segment's commanded motion and control system response are much faster than the estimator loop. This causes the edge sensor control system to try to cancel out the errors before the estimator has had the chance to calculate what the update to the reference signal should be. As FIG. 15 illustrates, as soon as the estimator catches up and settles, it is very accurate. The data in FIG. 14 were subtracted from the data in FIG. 15 to calculate the error in the real-time estimate. The RMS error during the time intervals after the transient had settled out was 34 nanometers, which is approximately 2 percent of the motion prescribed for segment 43.

The table of FIG. 11 indicates that the GRoCECS, when applied to a 91-segment array of hexagonal mirrors, can accurately estimate all the tip, tilt and piston states to better than 2 percent RMS. That means that if a particular state had a value of 1.0 micron, the GRoCECS could estimate and control that state to within 20 nanometers. Extrapolating from the table of FIG. 11 indicates that accuracy will get better if there are more segments in the array. The test results in FIG. 14 and FIG. 15 confirm the theory. The estimator is accurate to better than 2 percent in estimating segment 43's piston motion during the verification test. Testing also indicated that a GRoCECS can maintain the GRoC of a large segmented telescope to within ±300 microns.

The theory and test results indicate that the GRoCECS can be applied to any segmented mirror. So long as the segmented mirror has an edge sensor system and a mirror actuation system, the GRoCECS can be adapted to and interfaced with the segmented mirror actuation and edge sensing systems.

The foregoing is considered as illustrative only of the principles of the invention, and since numerous modifications and changes will readily occur to those skilled in the art, it is not desired to limit the invention to the exact construction and operation shown and described, and accordingly, all suitable modifications and equivalents may be resorted to, falling within the scope of the present invention.

What is claimed is:

1. An apparatus to control positions of plural mirror segments in a segmented mirror, comprising:
    an edge sensor system to output current edge sensor measurements corresponding to respective positions of plural mirror segments; and
    a controller to produce actuator commands for controlling plural mirror actuators by comparing the current edge sensor measurements with calculated edge sensor bias measurements representing a global radius of curvature, wherein the plural mirror actuators respond to the actuator commands by moving respective positions of the mirror segments.

2. The apparatus according to claim 1, wherein said controller further comprises:
    a global radius estimator and control unit to accumulate the actuator commands output from said controller and to calculate the edge sensor bias measurements from the accumulated actuator commands and an estimator matrix.

3. The apparatus according to claim 2, further comprising:
    a summation unit to calculate a plurality of edge sensor error signals from the current edge sensor measurements and the edge sensor bias measurements; and
    an optimal control matrix unit to accumulate the plurality of edge sensor error signals calculated by said summation unit and output the corresponding plurality of actuator commands.

4. The apparatus according to claim 3,
    wherein said summation unit calculates the plurality of edge sensor error signals through combination of the current edge sensor measurements; the edge sensor bias measurements and a plurality of edge sensor reference measurements.

5. The apparatus according to claim 3, said global radius estimator and control unit further comprising:
    an accumulator unit to receive and store the actuator commands; and
    an estimator matrix to produce edge sensor bias measurements from the plurality of stored actuator commands,
    wherein said summation unit calculates the plurality of edge sensor error signals from the current edge sensor measurements, the edge sensor bias measurements, and edge sensor reference measurements.

6. The apparatus according to claim 5, wherein the edge sensor reference measurements are recorded when the segmented mirror is initially aligned and the current edge sensor measurements are recorded after movement of the plural mirror segments.

7. The apparatus according to claim 1, wherein the edge sensor system includes a plurality of sensors respectively attached to a corresponding plurality of hexagon mirror segments, said sensors outputting the plurality of current edge sensor measurements corresponding to movement of respective hexagon mirror segments.

8. The apparatus according to claim 1, wherein said plurality of mirror actuators are tip/tilt/piston control actuators.

9. The apparatus according to claim 1, further comprising:
an edge sensor control unit, disposed within said control unit, for producing the plurality of actuator commands; and
an accumulator unit, disposed within said control unit, for receiving and storing the actuator commands output from said edge sensor control unit,
wherein the stored actuator commands are used to calculate future actuator commands.

10. The apparatus according to claim 1, further comprising:
an edge sensor control unit, disposed within said control unit, for producing the plurality of actuator commands; and
an accumulator unit, disposed within said control unit, for receiving and storing the actuator commands output from said edge sensor control unit,
wherein the stored actuator commands do not include commands for controlling a plurality of boundary condition mirror segments, and the stored actuator commands are used to calculate future actuator commands.

11. The apparatus according to claim 10, wherein there are a total of four boundary condition mirror segments so configured and arranged as to define a sphere.

12. The apparatus according to claim 1, said controller further comprising:
an edge sensor control unit outputting the actuator commands in response to the current edge sensor measurements;
an accumulator unit to accumulate actuator commands output from said edge sensor control unit;
an estimator matrix to convert the accumulated actuator commands output from said accumulator unit into a plurality of boundary condition actuator commands,
wherein the boundary condition actuator commands are combined with the actuator commands output from said edge sensor control unit before transmission to corresponding actuators.

13. The apparatus according to claim 12, further comprising:
a summation unit to calculate a plurality of edge sensor error signals from the current edge sensor measurements and a plurality of edge sensor reference measurements.

14. The apparatus according to claim 12, wherein the edge sensor system includes a plurality of sensors respectively attached to a corresponding plurality of hexagon mirror segments, said sensors outputting the plurality of current edge sensor measurements corresponding to movement of respective hexagon mirror segments.

15. The apparatus according to claim 12, wherein said plurality of mirror actuators are tip/tilt/piston control actuators.

16. A method of generating a plurality of actuator commands to control a plurality of mirror segments, comprising:
receiving current edge sensor measurements corresponding to respective positions of plural mirror segments;
comparing the current edge sensor measurements with edge sensor bias measurements defining a global radius of curvature of the plurality of mirror segments; and
producing a plurality of actuator commands for controlling the plural mirror segments in response to said comparing operation.

17. The method according to claim 16, further comprising:
accumulating the plurality of actuator commands; and
producing the edge sensor bias measurements defining the global radius of curvature from the accumulated actuator commands by calculation of an estimator matrix.

18. The method according to claim 16, further comprising:
calculating a plurality of edge sensor error signals from the current edge sensor measurements and the edge sensor bias measurements; and
accumulating the plurality of edge sensor error signals calculated in said calculating operation and outputting the plurality of actuator commands for controlling the plural mirror segments.

19. The method according to claim 16, further comprising:
calculating the plurality of edge sensor error signals through combination of the current edge sensor measurements, the edge sensor bias measurements, and a plurality of edge sensor reference measurements.

20. The method according to claim 16, further comprising:
receiving and storing the actuator commands; and
producing the edge sensor bias measurements from the plurality of stored actuator commands,
whereby said comparing operation compares the current edge sensor measurements with the produced edge sensor bias measurements.

21. An apparatus to control positions of plural mirror segments in a segmented mirror, comprising:
an edge sensor system to output a plurality of current edge sensor measurements corresponding to respective positions of a plurality of mirror segments;
a controller to produce a plurality of actuator commands by comparing the plurality of current edge sensor measurements with a plurality of edge sensor bias measurements defining a global radius of curvature; and
a plurality of mirror actuators responding to the plurality of actuator commands by moving the respective positions of the plurality of mirror segments.

* * * * *